June 5, 1928.
J. ZUBATY
1,672,189
THERMOSTATIC CONTROL FOR SPEEDOMETERS
Filed June 20, 1927
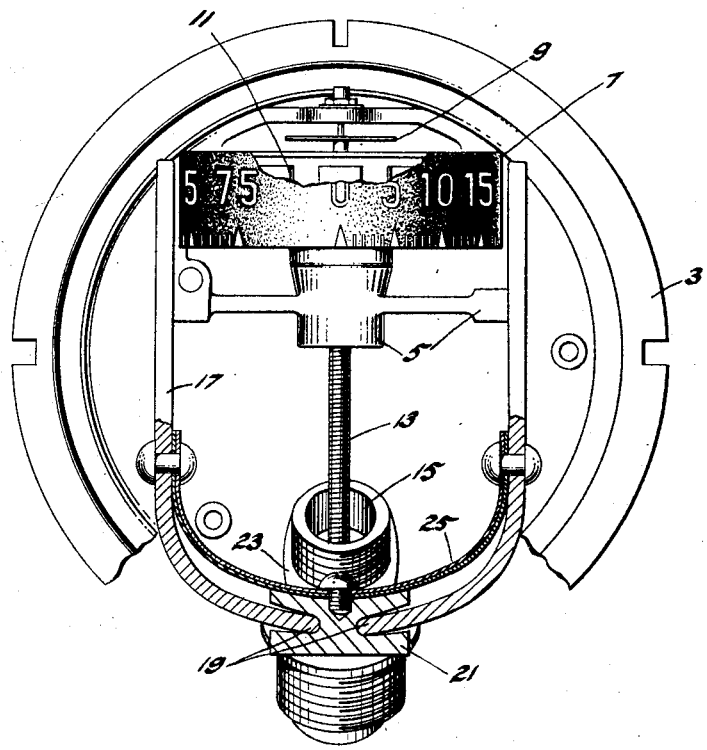
Inventor
Joseph Zubaty
By Blackmore, Spencer & Fish
Attorney Patented June 5, 1928.

1,672,189

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

THERMOSTATIC CONTROL FOR SPEEDOMETERS.

Application filed June 20, 1927. Serial No. 200,278.

This invention relates to measuring instruments and has been designed more particularly as an improvement in a speedometer for motor vehicles.

The object of the invention is to associate with a speedometer mechanism means to provide a thermostatic control whereby the errors in the readings due to temperature changes may be automatically corrected.

The invention is illustrated in the accompanying drawing which shows in its single figure an elevation of the improved device, parts being shown in section.

Referring more particularly to the drawing, numeral 3 represents the annular flange on the front edge of the casing member. Within the casing is shown portions 5 of a frame which carries the operative parts of the instrument. The usual speed cup is illustrated at 7 mounted for rotation on bearings as usual and biased to a zero position by a coil spring 9. Within the speed cup is shown a rotor 11, this rotor being driven by a flexible driving member 13 which extends out through an opening 15 in the frame member where it may be connected in the conventional manner to the flexible shaft of the speedometer drive.

The magnet 17 is of U-shape, its arms terminating in poles positioned diametrically with reference to the speed cup. Differing from the conventional practice the two arms are separate from each other, and each arm is hingedly connected as at 19 in a piece of soft steel 21 which may be part of the frame, if preferred, or may be separable therefrom. Secured to said part 21 by means of screw 23 is a bimetallic plate 25. The screw 23 holds the bimetallic plate at its mid-portion and the extremities of the plate are secured by rivets or other convenient fastening means to the arms of the magnet.

It is well understood that variations of temperature interfere with the accuracy of the readings of magnetic measuring instruments of this kind. The resistance of the speed cup to the lines of force is such that at high temperatures the readings are low and at low temperatures the readings tend to be high. The bimetallic plate 25 is therefore positioned in such a way that at low temperatures it tends to separate the magnetic poles and weaken the flux between said poles across the gap. At high temperatures, on the other hand, the thermostat brings the poles of the magnet closer to the diameter of the speed cup. In this way, when the temperature is high and the poles are brought closer together the magnetic flux across the gap is increased and the tendency of the speed cup to read low is offset.

The drawing shows a single bimetallic plate 25 intermediately secured to part 21 and terminally secured to the arms of the magnet 17. This I now regard as the preferred form, but it will be understood that the inventive idea may be carried out by the means of a single bimetallic member terminally secured to the part 21 and to one only of the arms of the magnet 17. Under such circumstances one only of the poles is movable. Nevertheless the effective interpolar gap is modified in the same way as before. It should also be explained that the movement of the pole or poles not only varies the distance between the poles themselves but varies the distance between each pole and the surrounding casing, which, if made of magnetic material, may serve as a variable shunt.

I claim:

1. In a magnetic measuring instrument, a magnet having arms terminating in poles, bimetallic heat sensitive means fixed at one point and terminally connected to at least one of said arms to move said arms relatively to each other and variably determine the spacing of said poles.

2. The invention defined by claim 1, said heat sensitive means being positioned within said arms, intermediately fixed, and terminally secured to said arms.

3. In a magnetic measuring instrument, a magnet formed of two separate parts, each part formed with one of the opposite poles, bimetallic heat sensitive means to vary the gap between the said poles.

4. The invention defined by claim 3, said heat sensitive means connected to at least one of said poles to move the same relatively to each other and to correct for inaccuracies in the readings of the instrument due to temperature changes.

5. In a magnetic measuring instrument including indicating means, a magnet, comprising two independent parts, each having a pole cooperating with the pole of the other to form an interpolar gap, bimetallic heat sensitive means secured to said parts to vary the linear dimensions of the gap.

6. The invention defined by claim 5 together with means holding said heat sensitive means in fixed position at an intermediate point.

7. In a magnetic measuring instrument, a U-shaped magnet, a rotor and an indicating member rotatably mounted between the poles of said magnet, said magnet being formed of two parts, each part being hingedly connected at one end, the hinged ends being in the curved portion of the magnet, and bimetallic heat sensitive means intermediately fixed in position and terminally connected to both magnet poles.

In testimony whereof I affix my signature.

JOSEPH ZUBATY.